US009189243B2

(12) United States Patent  
Mohammed et al.

(10) Patent No.: US 9,189,243 B2  
(45) Date of Patent: Nov. 17, 2015

(54) EFFICIENT ROLLBACK AND RETRY OF CONFLICTED SPECULATIVE THREADS WITH HARDWARE SUPPORT

(71) Applicant: International Business Machines Corporation, Armonk, NY (US)

(72) Inventors: Khaled A. Mohammed, Markham (CA); Martin Ohmacht, Yorktown Heights, NY (US); Raul E. Silvera, Woodbridge (CA); Kai-Ting A. Wang, North York (CA)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/632,022

(22) Filed: Sep. 30, 2012

(65) Prior Publication Data

US 2014/0096142 A1 Apr. 3, 2014

(51) Int. Cl.  
*G06F 9/48* (2006.01)  
*G06F 9/38* (2006.01)  
*G06F 9/52* (2006.01)

(52) U.S. Cl.  
CPC ............ *G06F 9/3861* (2013.01); *G06F 9/3842* (2013.01); *G06F 9/3863* (2013.01); *G06F 9/4843* (2013.01); *G06F 9/52* (2013.01); *G06F 9/4881* (2013.01)

(58) Field of Classification Search  
None  
See application file for complete search history.

(56) References Cited

U.S. PATENT DOCUMENTS

| | | | |
|---|---|---|---|
| 7,340,569 B2 | 3/2008 | Goodman et al. | |
| 8,001,329 B2 | 8/2011 | von Praun | |
| 8,438,571 B2 * | 5/2013 | Gooding et al. | 718/102 |
| 2009/0177871 A1 | 7/2009 | Von Praun et al. | |
| 2009/0287725 A1 | 11/2009 | von Praun | |
| 2011/0029490 A1 | 2/2011 | Agarwal et al. | |
| 2011/0209154 A1 | 8/2011 | Gooding et al. | |
| 2011/0209155 A1 | 8/2011 | Giampapa et al. | |
| 2011/0225375 A1 | 9/2011 | Rajwar et al. | |

OTHER PUBLICATIONS

Rundberg, Peter, et al., "An All-Software Thread-Level Data Dependence Speculation System for Multiprocessors," Journal of Instruction-Level Parallelism, 2001.  
Rajwar, Ravi, et al., "Speculative Lock Elision: Enabling Highly Concurrent Multithreaded Execution," Proceedings of the 34th International Symposium on Microarchitecture (MICRO), Dec. 2001.

(Continued)

*Primary Examiner* — Qing Wu  
(74) *Attorney, Agent, or Firm* — Nelson and Nelson; Daniel P. Nelson; Alexis V. Nelson (57) ABSTRACT

A method for rolling back speculative threads in symmetric-multiprocessing (SMP) environments is disclosed. In one embodiment, such a method includes detecting an aborted thread at runtime and determining whether the aborted thread is an oldest aborted thread. In the event the aborted thread is the oldest aborted thread, the method sets a high-priority request for allocation to an absolute thread number associated with the oldest aborted thread. The method further detects that the high-priority request is set and, in response, clears the high-priority request and sets an allocation token to the absolute thread number associated with the oldest aborted thread, thereby allowing the oldest aborted thread to retry a work unit associated with the absolute thread number. A corresponding apparatus and computer program product are also disclosed.

13 Claims, 4 Drawing Sheets

(56) References Cited

OTHER PUBLICATIONS

Raman, Arun, et al., "Speculative Parallelization Using Software Multi-Threaded Transactions," Proceedings of the Fifteenth Edition of ASPLOS on Architectural Support for Programming Languages and Operating Systems, pp. 65-76, Mar. 2010.

Oancea, Cosmin, et al., "Distributed Models of Thread-Level Speculation," Proceedings of the International Conference on Parallel and Distributed Processing Techniques and Applications, 2005.

Prabhu, Prakash, et al., "Safe Programmable Speculative Parallelism," Proceedings of the 2010 ACM SIGPLAN Conference on Programming Language Design and Implementation, pp. 50-61, 2010.

* cited by examiner

EFFICIENT ROLLBACK AND RETRY OF CONFLICTED SPECULATIVE THREADS WITH HARDWARE SUPPORT

FIELD OF THE INVENTION

This invention relates to apparatus and methods for efficiently rolling back and retrying conflicted speculative threads in SMP environments.

BACKGROUND OF THE INVENTION

Speculative execution (SE), also known as thread-level speculation (TLS), requires in-order start, as well as in-order commit of threads. The workload is typically split into a sequence of work units, referred to as absolute thread numbers (ATNs), that are assigned to a group of n threads, in sequence. A complete round of allocation assigns work units to threads $T_0, T_1, \ldots, T_{n-2}, T_{n-1}$. By dispatching the threads in order, and committing them in order, program semantics are preserved.

The manner in which current symmetric-multiprocessing (SMP) software runtime systems perform speculative execution is inefficient and difficult to debug. For example, current SMP systems require the kernel to track the number of conflict events (i.e., events causing threads to abort). When the number of conflict events reaches a threshold, the kernel modifies a global variable, referred to herein as an "allocation token," to initiate retries of the aborted threads. Threads operating in user space also need to update the allocation token. As a result, a lock is required to protect the allocation token. Implementing a lock that is shared between the kernel and the SMP runtime makes the design both inefficient as well as difficult to debug. For example, a sequence of code used to start speculation is shown below. A similar locking sequence is also present in the decision code.

```
while {
    lock allocation_token;
    if (allocation_token == thread's ATN)
        proceed to obtain specID;
    else
        unlock allocation_token;
        continue;
}
```

In view of the foregoing, what are needed are apparatus and methods to more efficiently roll back and retry conflicted speculative threads in SMP environments. Ideally, such apparatus and methods will remove the locking requirement associated with the allocation token.

SUMMARY

The invention has been developed in response to the present state of the art and, in particular, in response to the problems and needs in the art that have not yet been fully solved by currently available apparatus and methods. Accordingly, apparatus and methods have been developed to more efficiently roll back speculative threads in symmetric-multiprocessing (SMP) environments. The features and advantages of the invention will become more fully apparent from the following description and appended claims, or may be learned by practice of the invention as set forth hereinafter.

Consistent with the foregoing, a method for rolling back speculative threads in symmetric-multiprocessing (SMP) environments is disclosed herein. In one embodiment, such a method includes detecting an aborted thread at runtime and determining whether the aborted thread is an oldest aborted thread. In the event the aborted thread is the oldest aborted thread, the method sets a high-priority request for allocation to an absolute thread number associated with the oldest aborted thread. The method further detects that the high-priority request is set and, in response, clears the high-priority request. The method then sets an allocation token to the absolute thread number associated with the oldest aborted thread, thereby allowing the oldest aborted thread to retry a work unit associated with the absolute thread number.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
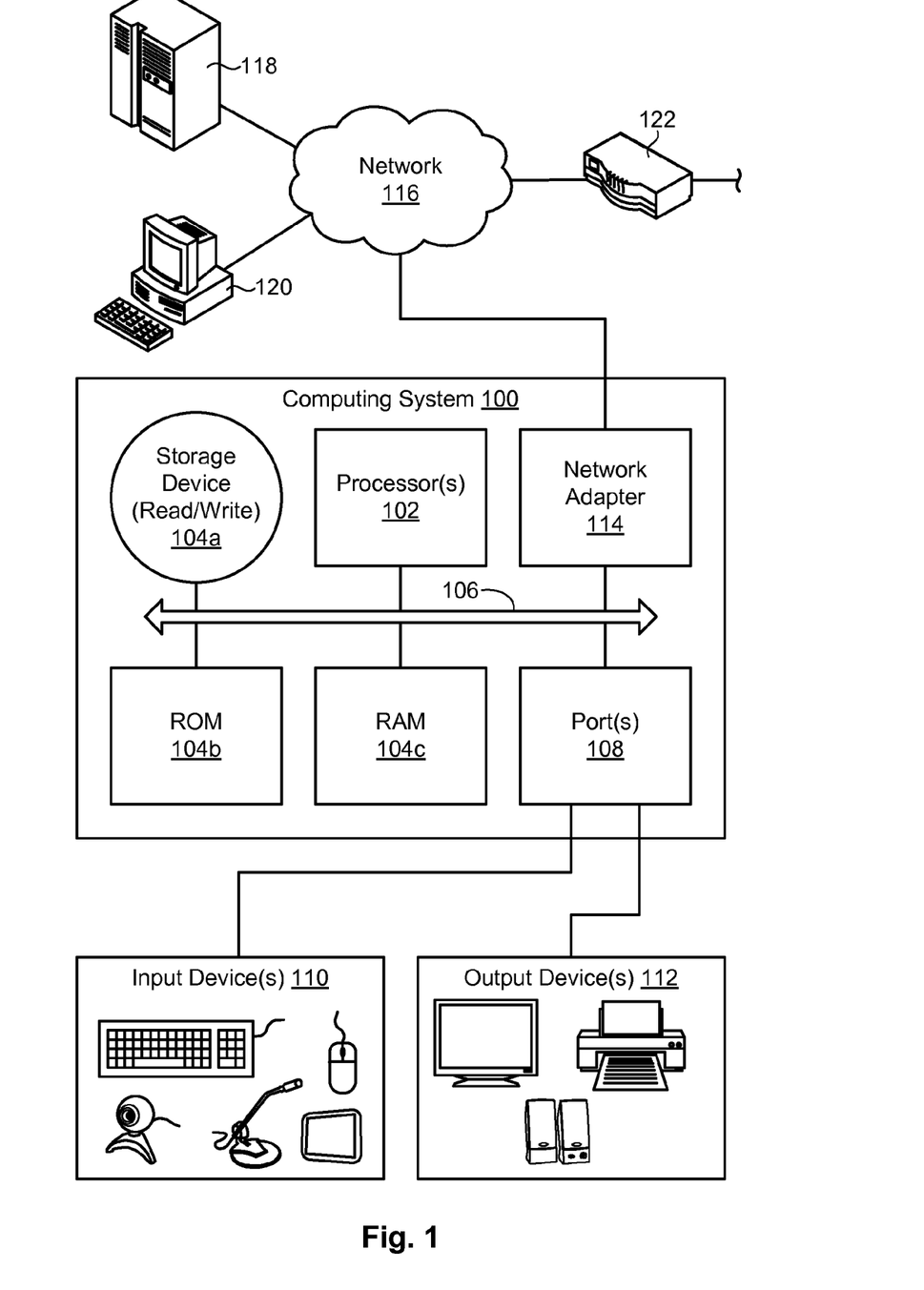
FIG. 1 is a high-level block diagram showing one example of a computing system in which an apparatus and method in accordance with the invention may be implemented.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. Each processor 102 is capable of simultaneous multi-threading (SMT), executing a number of hardware threads. The processor(s) 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
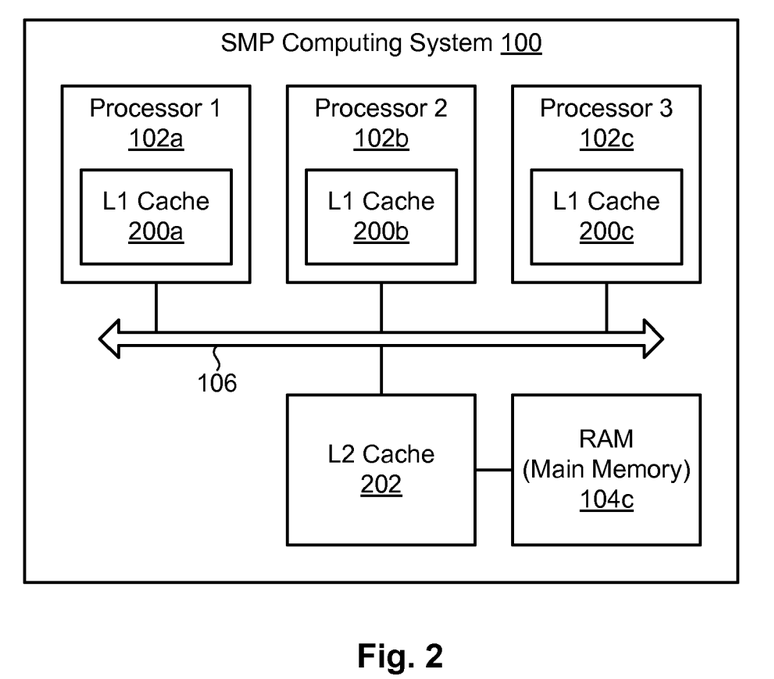
FIG. 2 is a high-level block diagram showing one example of a computing system (i.e., hardware platform) configured to perform symmetric multiprocessing (SMP)

Referring to FIG. 2, one example of a computing system 100 configured for symmetric multiprocessing (SMP) is illustrated. As shown, the SMP computing system 100 (also called a symmetric multiprocessor 100 or symmetric multiprocessor system 100) includes multiple processors 102a-c connected to a single shared memory 104c and controlled by a single operating system (OS) instance. The processors 102a-c may be interconnected using buses 106, crossbar switches, on-chip mesh networks, or the like. The SMP computing system 100 may allow any processor 102a-c to work on any task no matter where data for that task is located in memory 104c, provided that each task in the system 100 is not executed by multiple processors 102a-c at the same time. With proper operating system support, the SMP computing system 100 may move tasks between processors 102a-c to balance the workload. In certain embodiments, each processor 102 in the SMP computing system 100 may have its own local level-one (L1) cache 200a-c to speed up data access and reduce traffic on the system bus 106. The processors 102a-c may also share a level-two (L2) cache 202.

Figure 3:
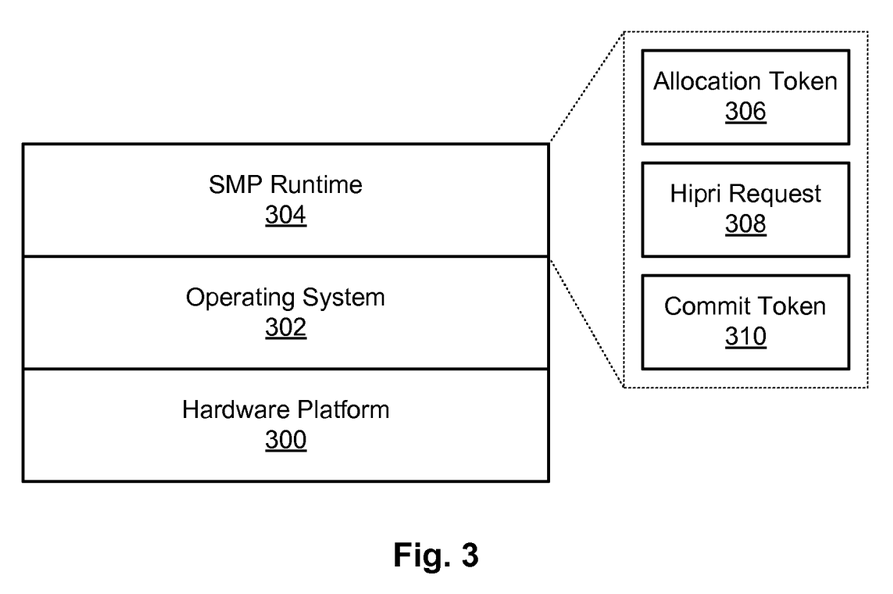
FIG. 3 is a high-level block diagram showing an SMP runtime in accordance with the invention, running on top of an operating system and hardware platform.

Referring to FIG. 3, in certain embodiments, an SMP computing system 100 in accordance with the invention includes a hardware platform 300 (i.e., processors 102a-c, bus 106, caches 200a-c, 202, memory 104c, etc.). An operating system 302 supporting symmetric multiprocessing (SMP) may run on top of the hardware platform 300 and an SMP runtime 304 may run on top of the operating system 302. As illustrated in FIG. 3, the SMP runtime 304 uses various global variables 306, 308, 310 to roll back and retry conflicted threads in a symmetric-multiprocessing (SMP) environment. These variables include one or more of an allocation token 306, a high-priority (i.e., "Hipri") request 308, and a commit token 310. The manner in which the SMP runtime 304 uses these variables 306, 308, 310 will be discussed in more detail hereafter. As will be shown hereafter, these variables 306, 308, 310 may be used by the SMP runtime 304 in such a manner as to eliminate the need to lock the allocation token 306. That is, the SMP runtime 304 uses the variables 306, 308, 310 in such a way as to eliminate the need to implement a shared lock between the kernel (i.e., operating system 302) and the SMP runtime 304.

Figure 4:
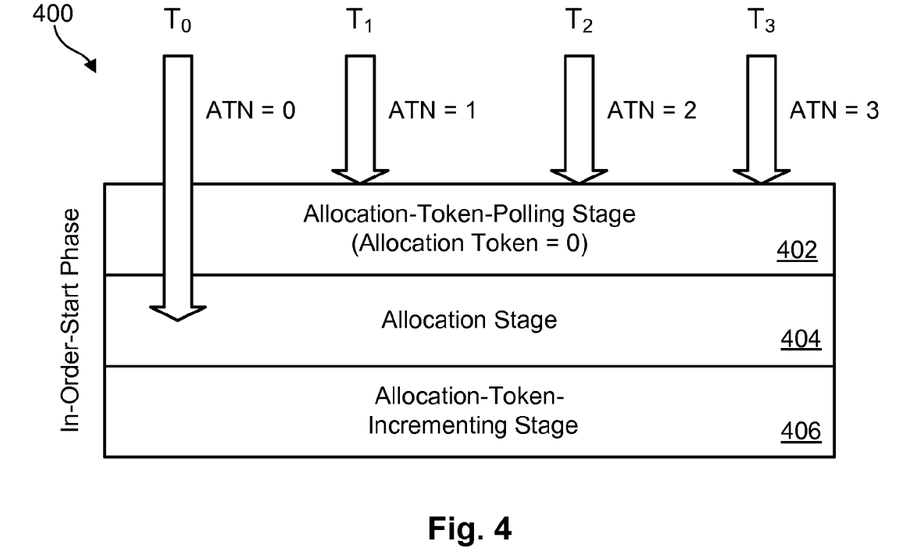
FIG. 4 is a high-level block diagram showing various threads progressing through an in-order-start phase of the SMP runtime.

Referring to FIG. 4, as previously mentioned, speculative execution (SE), also known as thread-level speculation (TLS), requires in-order start, as well as in-order commit of threads. The workload is typically split into a sequence of work units, referred to as absolute thread numbers (ATNs), which are assigned to a team of n threads, in sequence. A complete round of allocation assigns work units to threads $T_0$, $T_1, \ldots, T_{n-2}, T_{n-1}$. By dispatching the threads in order, and committing them in order, program semantics may be preserved.

In order to ensure that parallelized code generates the same output that it would if it were executed serially, namely by a single thread, the following criteria must be met: In a scenario where two threads a and b are waiting for a hardware speculation identifier (referred to herein as a "specID"), and the threads have been assigned work units with ATN values x and y respectively, if x<y, then thread a should receive a specID that is less than thread b. Furthermore, where threads have consecutive ATNs, there should be no gap between the specIDs assigned to the threads.

FIG. 4 is a high-level block diagram showing multiple threads $T_0$, $T_1$, $T_2$, and $T_3$ progressing through an in-order-start phase 400 of the SMP runtime 304. Under a normal operating mode, a thread-selection phase assigns each thread a unique ATN value. FIG. 4 shows a scenario where the thread selection phase has assigned fours threads $T_0$, $T_1$, $T_2$, and $T_3$ work units having ATNs 0, 1, 2, and 3, respectively. A global counter, namely the allocation token 306 previously discussed, is used to start the threads in the order of their ATN values. In the illustrated example, the allocation token 306 is initialized to zero to allow the thread having ATN=0 to start.

Each thread, after retrieving a work unit associated with a particular ATN, proceeds to the in-order-start phase illustrated in FIG. 4. As shown, the in-order-start phase 400 includes an allocation-token-polling stage 402, an allocation stage 404, and an allocation-token-incrementing stage 406. During the allocation-token-polling stage 402, each thread polls the allocation token 306 and waits for its turn to enter the allocation stage 404. When the allocation token 306 equals a thread's ATN value, the thread proceeds to the allocation stage 404. During the allocation stage 404, the thread is allocated a hardware specID. After receiving a specID, the thread proceeds to the allocation-token-incrementing stage 406, which increments the allocation token 306 by one to allow the next thread to proceed through the in-order-start phase 400. Using this protocol, only a single thread passes through the allocation stage 404 at any given time.

Figure 5:
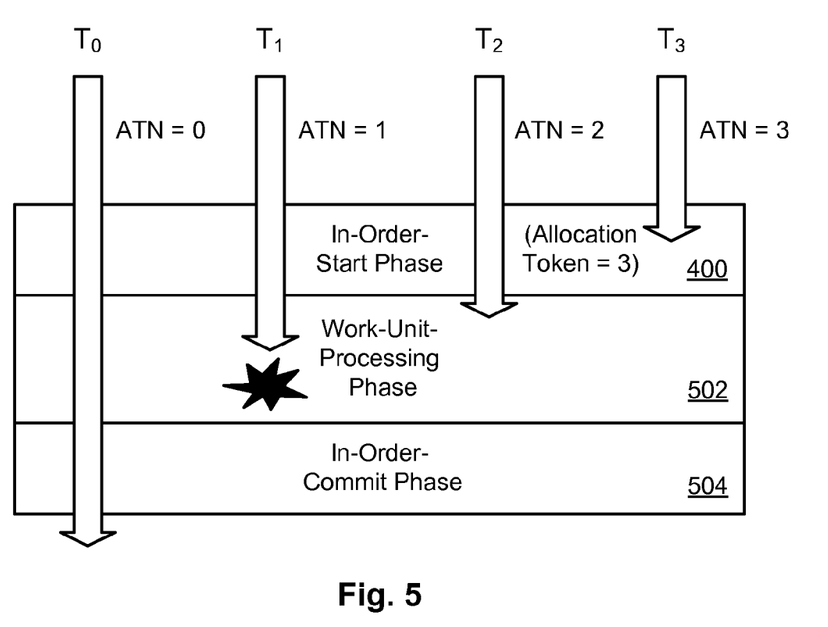
FIG. 5 is a high-level block diagram showing an example of a thread that aborts after progressing through the in-order-start phase of the SMP runtime.

Referring to FIG. 5, complication of the above protocol arises in situations where a thread is rolled back and needs to retry its work unit, such as in cases where a thread aborts due to a conflict. In a rollback scenario, a thread which was previously allocated a specID aborts while performing its work unit and returns to the in-order-start phase 400 in order to receive a new specID. Note that such a thread still has the same ATN it had prior to aborting. However, by the time the thread aborts, the allocation token 306 will have incremented above the thread's ATN value. Furthermore, by the time the thread aborts, other threads with larger ATNs may have already proceeded through the in-order-start phase and received specIDs. FIG. 5 shows such a scenario.

As shown in FIG. 5, after proceeding through the in-order-start phase 400, a thread $T_0$ processes its work unit while in the work-unit-processing phase 502. Upon completing its work unit, $T_0$ proceeds to an in-order-commit phase, where it waits for a global counter (i.e., the commit token 310 previously discussed) to equal its ATN. When the commit token 310 equals its ATN, $T_0$ commits the work that was performed in the work-unit-processing phase 502.

Assume that a second thread $T_1$ has proceeded through the in-order-start phase 400 and is processing its work unit in the work-unit-processing phase 502 when it aborts due to a conflict or other problem. Further assume that at the time $T_1$ aborts, $T_2$ has already proceeded through the in-order-start phase 400 and received a specID. Assume that thread $T_2$ has incremented the allocation token 306 to three, thereby allowing thread $T_3$ to begin proceeding through the in-order-start phase 400. When thread $T_1$ aborts, thread $T_1$ returns to the in-order-start phase 400 in order to retry its work unit. The ATN value assigned to thread $T_1$ remains unchanged.

Because the allocation token 306 has incremented above the ATN of thread $T_1$ by the time $T_1$ returns to the in-order-start phase 400, thread $T_1$ will not get a chance to retry its work unit under a normal operating mode. That is, the allocation token 306 will never equal $T_1$'s ATN, thereby preventing $T_1$ from re-proceeding through the in-order-start phase 400. Simply resetting the allocation token 306 to the ATN of $T_1$, thereby allowing $T_1$ to once again proceed through the in-order-start phase 400, may create a race on the allocation token 306 (i.e., a race may be created between the aborted thread attempting to retry its work unit and the thread currently passing through the in-order-start phase 400, each of which may attempt to update the allocation token 306). Such a scenario may lead to program hangs.

In order to eliminate the race condition discussed above, the oldest aborted thread may set the high-priority request variable 308 previously discussed instead of modifying the allocation token 306 directly. The high-priority request 308 may identify the oldest aborted thread's ATN and indicate that the oldest aborted thread wishes to reenter the allocation stage 404 and receive a new specID, thereby allowing the oldest aborted thread to retry its work unit. A younger thread whose ATN is equal to the allocation token 306 will, upon entering the allocation-token-polling stage 402, detect that the high-priority request 308 is set. The younger thread may then set the allocation token 306 equal to the ATN identified in the high-priority request 308. This will allow the oldest aborted thread to re-proceed through the in-order-start phase 400 and receive a new specID. This methodology will be discussed in more detail in association with FIG. 6.

Figure 6:
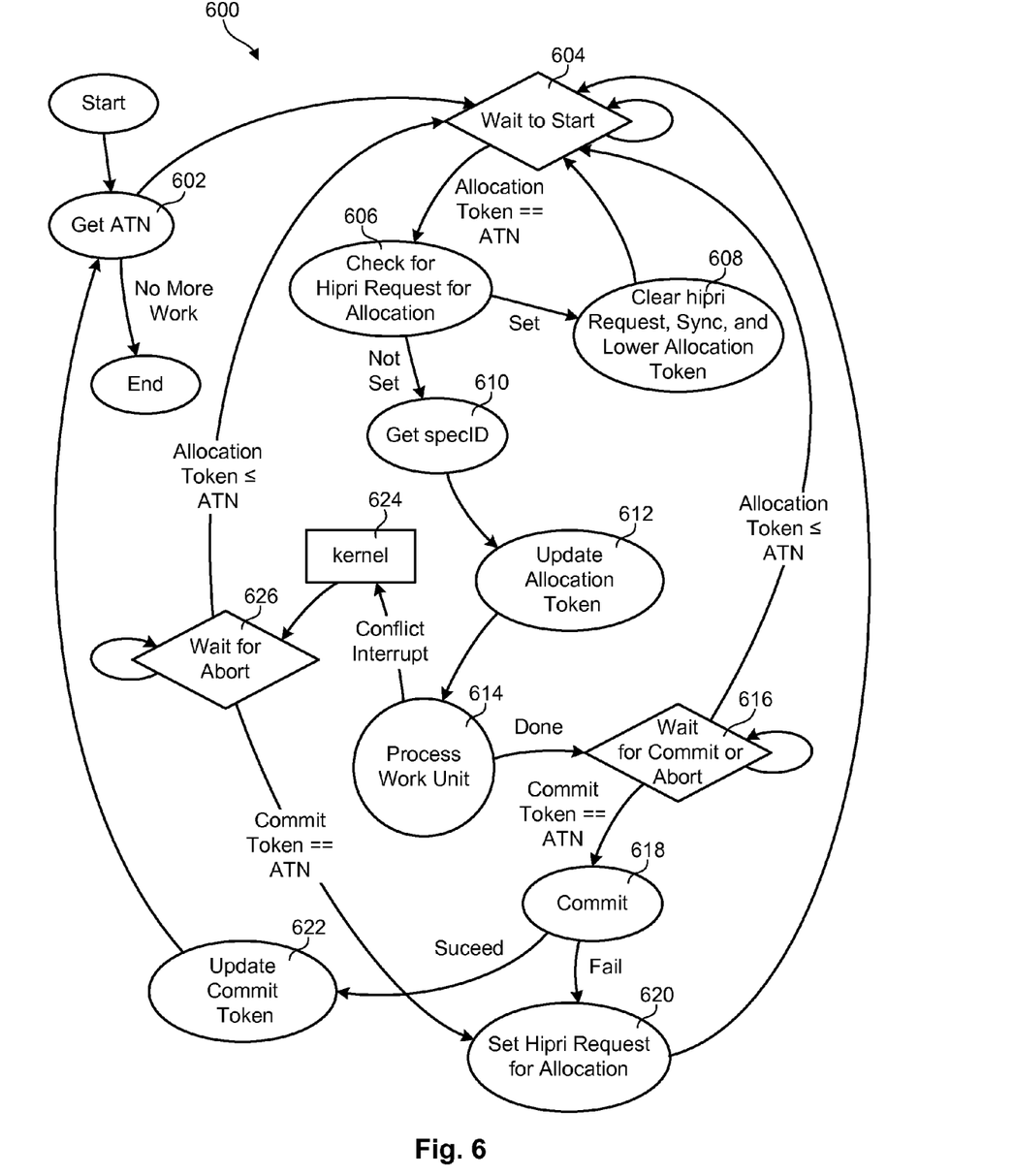
FIG. 6 is a state diagram showing operation of the SMP runtime.

Referring to FIG. 6, a state diagram 600 showing the operation of the SMP runtime when rolling back and retrying conflicted (i.e., aborted) threads is illustrated. For the sake of example, the state diagram 600 will be discussed in association with a set of threads $T_0$, $T_1$, $T_2$, and $T_3$. Assume that the thread $T_0$ is initially assigned 602 a work unit having ATN=0, after which the thread waits at step 604 by polling the allocation token 306. When the thread $T_0$ detects that the allocation token 306 equals the thread's ATN, the thread $T_0$ checks the high-priority request 308 for allocation. Assuming the high-priority request 308 is not set, the thread $T_0$ receives 610 a specID and updates 612 the allocation token 306 (i.e., increments the allocation token 306 to allow the next thread $T_1$ (ATN=1) to enter the in-order-start phase 400 and receive a specID).

Once the thread $T_0$ updates 612 the allocation token 306, the thread $T_0$ begins processing 614 its work unit. Assuming the thread $T_0$ finishes its work unit, the thread $T_0$ waits 616 to commit 618 (i.e., make permanent) the work unit. Waiting 616 may include waiting 616 for a commit token 310 to equal the thread's ATN, thereby authorizing the thread $T_0$ to commit 618 its work unit. Alternatively, the thread $T_0$ may experience a conflict while processing 614 its work unit that may cause a hardware interrupt to be generated and sent to the kernel 624. In such a case, the thread $T_0$ may proceed to step 626 and wait to abort. Waiting 626 to abort may include waiting 626 for a commit token 310 to equal the thread's ATN so that the thread $T_0$ may abort and return to step 604, where it may wait to retry its work unit. If the commit token 310 increments to equal the thread's ATN, thereby allowing it to abort, then thread $T_0$ will know that it is the oldest aborted thread. That is, the thread $T_0$ will know that threads having ATNs lower than thread $T_0$'s ATN will have successfully committed since the commit token 310 was incremented to equal thread $T_0$'s ATN. For the purposes of this specification, the "oldest aborted thread" is defined to be the aborted thread whose ATN is equal to the commit token 310. This is important since only the oldest aborted thread is allowed to set the high-priority request 308. Where thread $T_0$ is the oldest aborted thread, thread $T_0$ will set 620 the high-priority request 308 for allocation to equal its ATN and return to step 604, where it may wait to retry its work unit.

On the other hand, if thread $T_0$ completes its work unit without experiencing a conflict, the thread $T_0$ may proceed to step 616 where it may wait for the commit token 310 to equal its ATN and thereby receive authorization to commit 618 its work unit. If the commit token 310 equals thread $T_0$'s ATN and the thread $T_0$ is able to successfully commit its work unit, the thread $T_0$ may update (i.e., increment) the commit token 310 and return to step 602, where it may receive a new ATN and associated work unit. The thread $T_0$ may then proceed through the state diagram 600 with a new work unit in the manner previously described.

On the other hand, if the commit token 310 equals thread $T_0$'s ATN but the thread $T_0$ is not able to successfully commit its work unit, the thread $T_0$ may set the high-priority request 308 for allocation to equal its ATN. As previously mentioned, setting the high-priority request 308 may indicate that the thread $T_0$ wishes to retry its work unit and thus would like the allocation token 306 to be reset to equal its ATN. The thread $T_0$ may then return to step 604 to wait to retry its work unit.

When an oldest aborted thread aborts and sets the high-priority request 308, all threads younger than the oldest aborted thread will also abort (if they haven't already) and return to step 604, since these threads will need to restart and commit sequentially. For example, assume that thread $T_0$ aborts at step 616 or step 626 and sets 620 the high-priority request 308. Further assume that at the time thread $T_0$ aborts and sets the high-priority request 308, younger threads $T_1$ (ATN=1) and $T_2$ (ATN=2) have already passed through the in-order-start phase 400 and have received specIDs, thereby allowing them to process their work units. Further assume that thread $T_3$ (ATN=3) is waiting at step 604 to enter the in-order-start phase 400. When the allocation token 306 is incremented to 3, thread $T_3$ will enter the in-order-start phase 400 and check 606 the high-priority request 308 for allocation. In this example, thread $T_3$ will see that the high-priority request 308 is set to the ATN of thread $T_0$.

Upon making this observation, thread $T_3$ will clear 608 the high-priority request 308, execute a system-wide memory synchronization 608 instruction to ensure the clearing of the high-priority request 308 is observed globally by all threads in the system 100, and then lower 608 the allocation token 306 to 0 (i.e., setting the allocation token 306 to the ATN of $T_0$). Thread $T_3$ then returns to step 604. As a result of thread $T_3$ not proceeding into the allocation stage 404, a specID is conserved. When the allocation token 306 is lowered to 0, thread $T_0$ (which is waiting at step 604) will detect that its ATN is equal to the allocation token 306 and reenter the in-order-start phase 400, thereby receiving a new specID.

When the allocation token 306 is lowered to 0, threads $T_1$ and $T_2$, which have already previously passed through the in-order-start phase 400 and received specIDs, will either be processing 614 their work units, waiting at step 616 to commit their work units, or waiting at step 626 to abort their work units. Upon aborting and setting the high-priority request 308, thread $T_0$ invalidates the specIDs of these threads. In the case that threads $T_1$ and $T_2$ are still processing 614 their work units, the invalidation will cause hardware interrupts to be generated for threads $T_1$ and $T_2$, thereby sending threads $T_1$ and $T_2$ to step 626. In the case that threads $T_1$ and $T_2$ are waiting at 616 to commit their work units, they will detect that their specIDs have become invalidated and will wait to abort at step 616 instead. While in states 626 or 616, threads $T_1$ and $T_2$ will wait until the allocation token 306 is lower than their ATNs and, in response, return to step 604 to retry their work units.

The illustrated method 600 has the benefit that since only one thread can be passing through the in-order-start phase 400 at any one time, there is no need to lock the allocation token 306. Only the thread that is passing through the in-order-start phase 400 can modify the allocation token 306. The thread that is passing through the in-order-start phase 400 will either increment the allocation token 306 or, if the high-priority request 308 is set, set the allocation token 306 to the ATN value identified in the high-priority request 308. This eliminates the need for a global lock and prevents races on the allocation token 306. The disclosed scheme also prevents races on the commit token 310 and the high-priority request 308, thereby eliminating the need for global locks on these variables. In the event a thread is the oldest aborted thread and all other threads have already proceeded through the in-order-start phase 400, the oldest aborted thread may in this instance be allowed to modify the allocation token 306 to equal its ATN, and thereby retry its work unit.

The disclosed technique leads to significant performance improvement and is much easier to debug. This is because the kernel may be kept minimalistic by leaving the invalidation of younger threads (i.e., invalidation of the specIDs) to the SMP runtime 304.

In certain embodiments, to minimize the number of specIDs that are allocated, the SMP runtime 304 may be configured to run the oldest thread non-speculatively. The oldest thread may have the privilege of modifying the main memory 104c directly, instead of buffering in the L2 cache 202. At any given time, only a single thread may be allowed to run non-speculatively. A thread, which is already running speculatively, or is about to run speculatively because it has already obtained a specID, may not switch to run non-speculatively even if it becomes the oldest thread. This is because the decision to run non-speculatively is made inside the allocation stage 404 and may not be changed at a later time.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A computer program product for efficiently rolling back and retrying conflicted speculative threads in symmetric-multiprocessing (SMP) environments, the computer program product comprising a non-transitory computer-readable storage medium having computer-usable program code embodied therein, the computer-usable program code comprising:
    computer-usable program code to detect an aborted thread at runtime;
    computer-usable program code to determine whether the aborted thread is an oldest aborted thread;
    computer-usable program code to, in the event the aborted thread is the oldest aborted thread, set a high-priority request for allocation to an absolute thread number assigned to the oldest aborted thread;
    computer-usable program code to detect that the high-priority request is set; and
    computer-usable program code to, in response to detecting that the high-priority request is set, clear the high-priority request and set an allocation token to the absolute thread number of the oldest aborted thread, thereby allowing the oldest aborted thread to retry a work unit associated with its absolute thread number.

2. The computer program product of claim 1, wherein detecting that the high-priority request is set comprises detecting by a thread having its absolute thread number equal to the allocation token.

3. The computer program product of claim 2, wherein setting the allocation token comprises setting, by the thread having its absolute thread number equal to the allocation token, the allocation token to the absolute thread number of the oldest aborted thread.

4. The computer program product of claim 1, further comprising computer-usable program code to abort all threads younger than the oldest aborted thread that have not already been aborted.

5. The computer program product of claim 4, wherein aborting all threads younger than the oldest aborted thread comprises invalidating speculative identifiers of all threads younger than the oldest aborted thread.

6. The computer program product of claim 1, wherein allowing the oldest aborted thread to retry comprises assigning a new speculative identifier to the oldest aborted thread.

7. The computer program product of claim 1, wherein determining whether the aborted thread is an oldest aborted thread comprises determining whether the absolute thread number of the aborted thread is equal to a commit token.

8. An apparatus for efficiently rolling back and retrying conflicted speculative threads in symmetric-multiprocessing (SMP) environments, the apparatus comprising:
    at least one processor;
    at least one memory device coupled to the at least one processor and storing computer instructions to cause the at least one processor to:
    detect an aborted thread at runtime;
    determine whether the aborted thread is an oldest aborted thread;
    in the event the aborted thread is the oldest aborted thread, set a high-priority request for allocation to an absolute thread number assigned to the oldest aborted thread;
    detect that the high-priority request is set; and
    in response to detecting that the high-priority request is set, clear the high-priority request and set an allocation token to the absolute thread number of the oldest aborted thread, thereby allowing the oldest aborted thread to retry a work unit associated with its absolute thread number.

9. The apparatus of claim 8, wherein detecting that the high-priority request is set comprises detecting by a thread having its absolute thread number equal to the allocation token.

10. The apparatus of claim 9, wherein setting the allocation token comprises setting, by the thread having its absolute thread number equal to the allocation token, the allocation token to the absolute thread number of the oldest aborted thread.

11. The apparatus of claim 8, further comprising computer instructions to cause the at least one processor to abort all threads younger than the oldest aborted thread that have not already been aborted.

12. The apparatus of claim 11, wherein aborting all threads younger than the oldest aborted thread comprises invalidating speculative identifiers of all threads younger than the oldest aborted thread.

13. The apparatus of claim 8, wherein determining whether the aborted thread is an oldest aborted thread comprises determining whether the absolute thread number of the aborted thread is equal to a commit token.

\* \* \* \* \*